United States Patent Office 3,347,889
Patented Oct. 17, 1967

3,347,889
HEXAORGANOTRITIN COMPOUNDS AND THE PREPARATION THEREOF
Albert K. Sawyer, Durham, N.H., assignor to M & T Chemicals Inc., New York, N.Y., a corporation of Delaware
No Drawing. Filed July 31, 1963, Ser. No. 299,103
15 Claims. (Cl. 260—429.7)

This invention relates to a novel technique of producing organotin compounds. More specifically it relates to a process for producing tritins.

According to certain of its aspects, the method of this invention for preparing $R_3Sn-SnR'_2-SnR_3$ comprises reacting as reactants two moles of $R_3SnZ$ and one mole of $R'_2SnX_2$ wherein one of Z and X is hydrogen and the other of Z and X is a proton acceptor selected from the group consisting of ½O, OH, and OR″, and R, R′, and R″ may each be a hydrocarbon radical, free of olefinic and acetylenic unsaturation, preferably selected from the group consisting of alkyl, alkaryl, aralkyl, aryl, and cycloalkyl radicals, maintaining said reactants together in a reaction mixture, and separating $R_3Sn-SnR'_2-SnR_3$ from said reaction mixture.

In the reactants $R_3SnZ$ and $R'_2SnX_2$, R and R′ may each preferably be a hydrocarbon radical preferably selected from the group consisting of alkyl, alkaryl, aralkyl, aryl, and cycloalkyl radicals. When R is alkyl, it may include methyl, ethyl, n-propyl, isopropyl, n-butyl, amyls, octyls, etc. When the R is alkaryl, it may include tolyl, xylyl, etc. When the R is aralkyl, it may include benzyl, ω-phenylpropyl, etc. When the R is aryl, it may include phenyl, etc. When R is cycloalkyl, it may include cyclohexyl, cycloheptyl, etc. Groups which are inertly substituted may be employed. The preferred group may be n-butyl.

In the reactants $R_3SnZ$ and $R'_2SnX_2$, at least one of Z and X will be hydrogen and the other of Z and X will be a proton acceptor selected from the group consisting of ½O, OH, and OR″. R″ may be selected from the same group as R and R′. Preferably R″ may be methyl and ethyl. Preferably Z will be hydrogen. The reactant $R_3SnZ$, which may be made by well known processes, may be typically as follows:

trimethyltin hydride
tri-n-butyltin hydride
tri-n-octyltin hydride
triphenyltin hydride
tricyclohexyltin hydride
tri-o-tolyltin hydride
tribenzyltin hydride
trimethyltin hydroxide
triethyltin hydroxide
tri-n-propyltin hydroxide
tri-n-phenyltin hydroxide
tri-n-cyclohexyltin hydroxide
bis(tri-n-butyltin) oxide
bis(tri-n-amyltin) oxide
bis(triphenyltin) oxide
bis(tribenzyltin) oxide
trimethyltin methoxide
triethyltin methoxide
tri-n-butyltin methoxide
tri-n-butyltin ethoxide
triphenyltin methoxide The preferred compound may be tributyltin hydride.
The reactant $R'_2SnX_2$, which may be made by well known processes, may typically be as follows:

dimethyltin dihydride
di-n-propyltin dihydride
di-n-butyltin dihydride
di-n-octyltin dihydride
diphenyltin dihydride
dicyclohexyltin dihydride
di-o-tolyltin dihydride
dibenzyltin dihydride
dimethyltin oxide
diethyltin oxide
di-n-propyltin oxide
di-n-butyltin oxide
di-n-octyltin oxide
diphenyltin oxide
dicyclohexyltin oxide
dibenzyltin oxide
dimethyltin dimethoxide
diethyltin dimethoxide
di-n-butyltin dimethoxide
diphenyltin dimethoxide
dicyclohexyltin dimethoxide
di-n-butyltin diethoxide The preferred compound may be di-n-butyltin oxide.

In practice of the process of this invention, the reactants may be mixed together, preferably in desired proportions, to form the reaction mixture. Preferably two moles of $R_3SnZ$ may be reacted with one mole of $R'_2SnX_2$. Typically the reactants are liquids which may be readily miscible. In some cases, one reactant, e.g. dibutyltin oxide, or diphenyltin oxide, may be a solid.

It may be desirable to use in the reaction mixture, an inert diluent. Preferably the reactants may be soluble or compatible with the inert diluent. Typical inert diluents may include inert hydrocarbons such as aromatic hydrocarbons including benzene, toluene, etc. or aliphatic hydrocarbons including hexane, heptane, octane, etc. Preferably the solvent may be one which has a boiling point of at least about 100° C. and typically 100° C.–200° C.

The reaction of this invention is preferably carried out under inert atmosphere, e.g. nitrogen since many of the raw materials, e.g. hydrides, or polytin products, e.g. ditins, may be oxidized by oxygen.

In carrying out the novel reaction, the reaction mixture may be maintained at 20° C.–200° C., preferably 100° C.–200° C. for 5 minutes to 24 hours. When one of the reactants is a compound containing the OR″ group, e.g. an alkoxide, the reaction may occur e.g. at room temperature of 20° C. in about 24 hours. In this case however, as in the other cases, it is preferred to heat the reaction mixture to 100° C.–120° C. as by a steam bath for typically 5 minutes to 16 hours.

When the reaction is carried out in the presence of inert diluent, it may be carried out at reflux temperature of the diluent, typically 80° C.–200° C., say 111° C. for the preferred diluent, toluene.

During this period, the following reaction may occur:

$$2R_3SnZ + R'_2SnX_2 \rightarrow R_3Sn-SnR'_2-SnR_3 + 2ZX$$

Typically the reaction may be as follows:

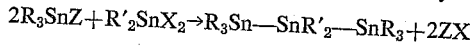

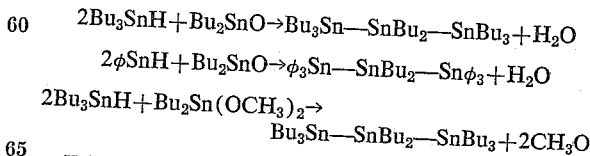

When the reaction is conducted at temperature above the effective boiling point of the by-product, e.g. water or alcohol, the by-product may be recovered as distillate—either alone or as an azeotrope with the inert diluent. When the reaction is conducted at low temperature, e.g. 20° C.–100° C., the by-product may be recovered as by distillation at vacuum of e.g. 1–20 mm. Hg.

At the completion of the reaction time, after the by-product has been removed, the reaction mixture may contain pure product or pure product together with solvent. Where the pure product is obtained as residue, it may be separated and recovered as such or further purified. Where the pure product is present together with diluent, the product (if insoluble in the diluent) may be filtered, washed, and further purified if desired. If the pure product is soluble in the diluent, it may be employed as is or the solvent may be separated as by distillation under reduced pressure.

In all cases, the products may be obtained in substantially stoichiometric yields in high purity.

For purpose of giving those skilled in the art a better understanding of the invention, reference will be made to the following illustrative examples wherein all parts are parts by weight unless otherwise stated.

Example 1

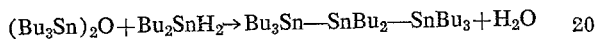

Into a reaction vessel maintained under an atmosphere of nitrogen, may be introduced 11.7 parts (0.05 mole) of di-n-butyltin dihydride and 29.8 parts (0.05 mole) of bis(tri-n-butyltin) oxide. The reaction mixture was heated by steam to approximately 100° C. for 48 hours during which time a flow of nitrogen gas was maintained to the reaction vessel. During the reaction, essentially no evolution of gas was noted, but nitrogen gas leaving the reaction vessel contained water which may be condensed. 0.9 part (0.05 mole) of water was recovered. The residue in the reaction vessel was 40.6 parts of octabutyltritin—substantially 100% yield.

Example 2

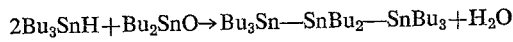

Into a reaction vessel maintained under an atmosphere of nitrogen, may be introduced 291 parts (1 mole) of tri-n-butyltin hydride and 124.5 parts (0.5 mole) of di-n-butyltin oxide. The reaction mixture was heated by steam to approximately 100° C. for 48 hours during which time a flow of nitrogen gas was maintained to the reaction vessel. During the reaction, no evolution of gas was noted, but nitrogen gas leaving the reaction vessel contained water which may be condensed. 18 parts (0.5 mole) of water were recovered. The residue in the reaction vessel was 406 parts of octabutyltritin as an essentially colorless liquid containing 43.4% Sn (theory for $(C_4H_9)_8Sn_3$—43.8% Sn). The yield was thus substantially quantitative. The molecular weight (as determined by osmometric technique in toluene) was 790—theory 813. When tested by the bromine titration test, the product consumed 100% of the theoretical amount of bromine, thus indicating that it contained two Sn—Sn bonds per molecule of product.

Example 3

Into a reaction vessel maintained under an atmosphere of nitrogen, may be introduced 116.4 parts (0.4 mole) of tri-n-butyltin hydride and 57.8 parts (0.2 mole) of diphenyltin oxide. The reaction mixture was heated by steam to approximately 100° C. for 48 hours during which time a flow of nitrogen gas was maintained to the reaction vessel. During the reaction, substantially no evolution of gas was noted, but nitrogen gas leaving the reaction vessel contained water which may be condensed. 3.6 parts (0.2 mole) of water were recovered. The residue in the reaction vessel was 170.6 parts of 1,1,1,3,3,3,-hexabutyl-2,2-diphenyltritin—substantially 100% yield. The molecular weight (as determined by osmometric technique in toluene) was 790—theory 852. When tested by the bromine titration test, the product consumed 100% of the theoretical amount of bromine, thus indicating that it contained two Sn—Sn bonds per molecule of product.

It is a particular feature of this invention that it makes possible the ready production of novel tritin compounds not readily attainable by other processes. These novel compounds may be particularly characterized by the formula $R_3Sn$—$SnR'_2$—$SnR_3$ wherein all of the R groups may be the same and at least one of the R' groups is different from the said R groups. In the preferred embodiment, both the R' groups may be the same. Typical of such compounds may be those wherein the R and R' groups are as follows:

| R | R' |
|---|---|
| methyl | ethyl |
| methyl | propyl |
| methyl | butyl |
| ethyl | butyl |
| propyl | butyl |
| butyl | propyl |
| methyl | phenyl |
| butyl | phenyl |
| phenyl | butyl |
| methyl | propyl and butyl |
| butyl | propyl and butyl |

It is a particular feature of many of these compounds that they may be mobile-to-viscous liquids having moderate-to-high boiling points. Many of these materials may be colorless liquids. For example, a preferred material 1,1,1,3,3,3-hexabutyl-2,2-diphenyltritin may be a liquid attainable in substantially 100% yield.

These compounds may be used as catalysts for various reactions. For example, they may be used in the polymerization of diene hydrocarbons having conjugated double bonds in the presence of cobalt or nickel compounds and aluminum halides, e.g. cobalt naphthenate and aluminum chloride. They may also find use as biocides e.g. fungicides, etc.

As many embodiments of this invention may be made without departing from the spirit and scope thereof, it is to be understood that the invention includes all such modifications and variations as come within the scope of the appended claims.

I claim:

1. The method of preparing $R_3Sn$—$SnR'_2$—$SnR_3$ which comprises reacting as reactants two moles of $R_3SnZ$ and one mole of $R'_2SnX_2$ wherein one of Z and X is hydrogen and the other of Z and X is a proton acceptor selected from the group consisting of ½ O, OH, and OR", and R, R', and R" are each hydrocarbon radicals, free of olefinic and acetylenic unsaturation, selected from the group consisting of alkyl, alkaryl, aralkyl, aryl, and cycloalkyl, maintaining said reactants together in a reaction mixture, and separating $R_3Sn$—$SnR'_2$—$SnR_3$ from said reaction mixture.

2. The method as claimed in claim 1 wherein R and R' are the same.

3. The method as claimed in claim 1 wherein R and R' are butyl.

4. The method as claimed in claim 1 wherein reactant $R_3SnZ$ is tributyltin hydride.

5. The method as claimed in claim 1 wherein reactant $R'_2SnX_2$ is $R'_2SnO$.

6. The method as claimed in claim 1 wherein reactant $R'_2SnX_2$ is dibutyltin oxide.

7. The method as claimed in claim 1 wherein said reaction mixture contains an inert diluent.

8. The method as claimed in claim 1 wherein said reaction mixture contains toluene.

9. The method as claimed in claim 1 wherein said reaction mixture contains inert diluent and the reaction is carried out at reflux temperature.

10. The method of preparing octa-n-butyltritin $Bu_3Sn$—$SnBu_2$—$SnBu_3$ which comprises reacting as reactants one mole of bis(tri-n-butyltin) oxide and one mole of di-n-butyltin dihydride, maintaining said reactants together in a reaction mixture, and separating octa-n-butyltritin from said reaction mixture.

11. The method of claim 10 wherein said reaction mixture contains inert diluent.

12. The method of preparing octa-n-butyltritin $Bu_3Sn—SnBu_2—SnBu_3$ which comprises reacting as reactants two moles of tri-n-butyltin hydride and one mole of di-n-butyltin oxide, maintaining said reactants together in a reaction mixture, and separating octa-n-butyltritin from said reaction mixture.

13. The method of preparing 1,1,1,3,3,3-hexabutyl-2,2-diphenyltritin which comprises reacting as reactants two moles of tributyltin hydride and one mole of diphenyltin oxide, maintaining said reactants together in a reaction mixture, and separating 1,1,1,3,3,3-hexabutyl-2,2-diphenyltritin from said reaction mixture.

14. $R_3SnSnR'_2SnR_3$ wherein R and R' are hydrocarbon radicals, all R groups being the same and at least one R' group being different from said R groups.

15. 1,1,1,3,3,3-hexabutyl-2,2-diphenyltritin.

References Cited

UNITED STATES PATENTS 3,067,003  12/1962  Wilberg et al. _____ 260—429

OTHER REFERENCES

Kraus et al., J.A.C.S., vol. 47, October 1925, p. 2571.

TOBIAS E. LEVOW, *Primary Examiner.*

E. C. BARTLETT, W. F. W. BELLAMY,

*Assistant Examiners.*